United States Patent
Pujare et al.

(10) Patent No.: US 9,819,636 B2
(45) Date of Patent: Nov. 14, 2017

(54) USER DIRECTORY SYSTEM FOR A HUB-BASED SYSTEM FEDERATING DISPARATE UNIFIED COMMUNICATIONS SYSTEMS

(71) Applicant: NextPlane, Inc., Sunnyvale, CA (US)

(72) Inventors: Sanjay Pujare, San Jose, CA (US); Saravanan Bellan, San Jose, CA (US); Silvia Restelli, San Jose, CA (US); Farzin Shahidi, Los Altos Hills, CA (US); Venky Talla, Secunderabad (IN)

( * ) Notice: Subject to any disclaimer, the term of this patent is extended or adjusted under 35 U.S.C. 154(b) by 25 days.

(21) Appl. No.: 13/914,520

(22) Filed: Jun. 10, 2013

(65) Prior Publication Data

US 2014/0365520 A1    Dec. 11, 2014

(51) Int. Cl.
  *G06F 17/30*  (2006.01)
  *H04L 12/58*  (2006.01)
  *H04L 29/08*  (2006.01)
  *H04L 29/12*  (2006.01)

(52) U.S. Cl.
  CPC ........ *H04L 51/36* (2013.01); *G06F 17/30312* (2013.01); *H04L 61/1523* (2013.01); *H04L 61/1594* (2013.01); *H04L 67/1095* (2013.01)

(58) Field of Classification Search
  CPC .............. G06F 17/30312; H04L 51/36; H04L 67/1095; H04L 61/1594; H04L 61/1523
  USPC ................................................. 707/769, 784
  See application file for complete search history.

(56) References Cited

U.S. PATENT DOCUMENTS

| | | | |
|---|---|---|---|
| 5,784,612 A | | 7/1998 | Crane et al. |
| 6,041,281 A | * | 3/2000 | Nimura et al. ............... 701/533 |
| 6,065,016 A | | 5/2000 | Stuntebeck et al. |
| 6,192,405 B1 | * | 2/2001 | Bunnell .................. H04L 63/104 |
| | | | 709/202 |
| 6,208,986 B1 | | 3/2001 | Schneck et al. |
| 6,298,128 B1 | * | 10/2001 | Ramey et al. ........... 379/142.01 |
| 6,418,200 B1 | * | 7/2002 | Ciccolella et al. ........ 379/88.18 |
| 6,463,056 B1 | | 10/2002 | Silva et al. |

(Continued)

FOREIGN PATENT DOCUMENTS

| EP | 1549024 A1 | 6/2005 |
|---|---|---|
| WO | 02/39237 | 5/2002 |
| WO | 2015054522 | 4/2015 |

OTHER PUBLICATIONS

Bogusz, Dariusz, et al., "Telco 2.0 for UC—an example of integration telecommunications service provider's SDP with enterprise UC system", FedCSIS 2012, Wroclaw, Poland, Sep. 9-12, 2012, pp. 603-606.*

(Continued)

*Primary Examiner* — Robert Stevens

(74) *Attorney, Agent, or Firm* — Steptoe & Johnson LLP

(57) ABSTRACT

A user directory for a hub-based system federating disparate unified communications systems is disclosed. According to one embodiment, the computer-implemented method includes connecting a first unified communications system and a second unified communications system through a federation server, synchronizing a directory entry from a directory of the first unified communications system to a user directory, where the directory entry contains user information of the first unified communications system, and providing the second unified communications system with an access to the directory entry.

32 Claims, 14 Drawing Sheets

(56) References Cited

U.S. PATENT DOCUMENTS

| | | | |
|---|---|---|---|
| 6,591,291 B1* | 7/2003 | Gabber et al. | 709/206 |
| 6,654,759 B1* | 11/2003 | Brunet et al. | |
| 6,665,378 B1* | 12/2003 | Spielman et al. | 379/88.12 |
| 6,738,462 B1* | 5/2004 | Brunson | 379/142.06 |
| 6,892,245 B1 | 5/2005 | Crump et al. | |
| 6,970,553 B1 | 11/2005 | Gao et al. | |
| 7,051,114 B1* | 5/2006 | Ravishankar et al. | 709/245 |
| 7,269,432 B2 | 9/2007 | Gress et al. | |
| 7,350,229 B1* | 3/2008 | Lander | H04L 63/0815 709/225 |
| 7,376,827 B1* | 5/2008 | Jiao | H04L 29/12066 370/351 |
| 7,383,436 B2* | 6/2008 | Srivastava | H04L 9/0827 380/277 |
| 7,443,961 B2* | 10/2008 | Schroeder et al. | 379/88.13 |
| 7,558,827 B2* | 7/2009 | Kawashima et al. | 709/206 |
| 7,577,132 B2* | 8/2009 | Katz et al. | 370/352 |
| 7,697,924 B2* | 4/2010 | Caspi et al. | 455/415 |
| 7,698,398 B1 | 4/2010 | Lai | |
| 7,706,266 B2 | 4/2010 | Plamondon | |
| 7,739,333 B2* | 6/2010 | Serr et al. | 709/205 |
| 7,953,979 B2 | 5/2011 | Borneman et al. | |
| 8,145,719 B2 | 3/2012 | Barman et al. | |
| 8,200,758 B2 | 6/2012 | Serr et al. | |
| 8,359,357 B2* | 1/2013 | Rodriguez et al. | 709/206 |
| 8,380,661 B2* | 2/2013 | Richards et al. | 707/609 |
| 9,077,726 B2 | 7/2015 | Pujare et al. | |
| 9,203,799 B2 | 12/2015 | Bellan et al. | |
| 9,241,012 B2 | 1/2016 | de Castro, Jr. et al. | |
| 2002/0037074 A1 | 3/2002 | Dowens et al. | |
| 2002/0083183 A1 | 6/2002 | Pujare et al. | |
| 2002/0087704 A1 | 7/2002 | Chesnais et al. | |
| 2002/0124057 A1* | 9/2002 | Besprosvan | 709/219 |
| 2002/0147927 A1* | 10/2002 | Tait | H04L 63/029 726/10 |
| 2002/0157089 A1 | 10/2002 | Patel et al. | |
| 2003/0018725 A1 | 1/2003 | Turner et al. | |
| 2003/0149781 A1 | 8/2003 | Yared et al. | |
| 2004/0083297 A1 | 4/2004 | Gazzetta et al. | |
| 2004/0098615 A1* | 5/2004 | Mowers | H04L 63/0807 726/8 |
| 2005/0022006 A1 | 1/2005 | Bass et al. | |
| 2005/0047438 A1 | 3/2005 | Sylvain | |
| 2005/0097317 A1* | 5/2005 | Trostle | H04L 9/0833 713/163 |
| 2005/0102513 A1 | 5/2005 | Alve | |
| 2005/0175021 A1 | 8/2005 | Ozugur et al. | |
| 2005/0288961 A1* | 12/2005 | Tabrizi | 705/1 |
| 2006/0021017 A1 | 1/2006 | Hinton et al. | |
| 2006/0021019 A1 | 1/2006 | Hinton et al. | |
| 2006/0053384 A1 | 3/2006 | La Petra et al. | |
| 2006/0120362 A1 | 6/2006 | Westman et al. | |
| 2006/0128409 A1 | 6/2006 | Gress et al. | |
| 2006/0136990 A1 | 6/2006 | Hinton et al. | |
| 2006/0205434 A1 | 9/2006 | Tom et al. | |
| 2006/0230124 A1 | 10/2006 | Belfiore et al. | |
| 2007/0011245 A1 | 1/2007 | Kawashima et al. | |
| 2007/0130343 A1 | 6/2007 | Pardo-Blazquez et al. | |
| 2007/0136603 A1 | 6/2007 | Kuecuekyan | |
| 2007/0202897 A1 | 8/2007 | Smith | |
| 2007/0234417 A1 | 10/2007 | Blakley, III et al. | |
| 2007/0285503 A1 | 12/2007 | Asthana et al. | |
| 2008/0010665 A1 | 1/2008 | Hinton et al. | |
| 2008/0021997 A1 | 1/2008 | Hinton | |
| 2008/0032695 A1 | 2/2008 | Zhu et al. | |
| 2008/0072301 A1 | 3/2008 | Chia et al. | |
| 2008/0082662 A1 | 4/2008 | Dandliker et al. | |
| 2008/0086564 A1 | 4/2008 | Putman et al. | |
| 2008/0144896 A1 | 6/2008 | Burke | |
| 2008/0215694 A1 | 9/2008 | Chen et al. | |
| 2008/0215717 A1 | 9/2008 | Zhou et al. | |
| 2008/0219223 A1 | 9/2008 | Bienas et al. | |
| 2008/0320576 A1 | 12/2008 | Curling | |
| 2009/0006076 A1 | 1/2009 | Jindal | |
| 2009/0019115 A1* | 1/2009 | Larson et al. | 709/206 |
| 2009/0019367 A1 | 1/2009 | Cavagnari et al. | |
| 2009/0049190 A1* | 2/2009 | Jiang et al. | 709/238 |
| 2009/0049202 A1 | 2/2009 | Pattison et al. | |
| 2009/0077251 A1 | 3/2009 | Brown et al. | |
| 2009/0089625 A1 | 4/2009 | Kannappan et al. | |
| 2009/0094336 A1 | 4/2009 | Echevarria et al. | |
| 2009/0100289 A1 | 4/2009 | Chen et al. | |
| 2009/0119763 A1 | 5/2009 | Park et al. | |
| 2009/0138615 A1 | 5/2009 | Cristallo et al. | |
| 2009/0150905 A1 | 6/2009 | Lin et al. | |
| 2009/0172776 A1 | 7/2009 | Makagon et al. | |
| 2009/0177735 A1* | 7/2009 | Algie et al. | 709/203 |
| 2009/0180602 A1 | 7/2009 | Ramanathan et al. | |
| 2009/0210496 A1 | 8/2009 | Shaffer et al. | |
| 2009/0276840 A1 | 11/2009 | Cao et al. | |
| 2009/0292814 A1 | 11/2009 | Ting et al. | |
| 2009/0307327 A1 | 12/2009 | Malik et al. | |
| 2009/0319672 A1 | 12/2009 | Reisman | |
| 2009/0327419 A1 | 12/2009 | Serr et al. | |
| 2009/0327441 A1 | 12/2009 | Lee et al. | |
| 2009/0327868 A1 | 12/2009 | Tsukikawa | |
| 2010/0017598 A1 | 1/2010 | Rodriguez et al. | |
| 2010/0057851 A1 | 3/2010 | Ionescu et al. | |
| 2010/0058120 A1 | 3/2010 | Coleman et al. | |
| 2010/0100925 A1 | 4/2010 | Hinton | |
| 2010/0162374 A1 | 6/2010 | Nair | |
| 2010/0205664 A1 | 8/2010 | Serr et al. | |
| 2010/0223334 A1 | 9/2010 | Narayanan et al. | |
| 2010/0251158 A1 | 9/2010 | Geppert et al. | |
| 2010/0287226 A1 | 11/2010 | Wright et al. | |
| 2010/0290611 A1 | 11/2010 | Ramanathan et al. | |
| 2011/0035443 A1 | 2/2011 | Jensen | |
| 2011/0138028 A1 | 6/2011 | Katz et al. | |
| 2011/0179180 A1 | 7/2011 | Schleifer et al. | |
| 2011/0231473 A1* | 9/2011 | Narayanan et al. | 709/203 |
| 2011/0231919 A1 | 9/2011 | Vangpat et al. | |
| 2011/0238761 A1 | 9/2011 | Mizokami | |
| 2011/0271332 A1 | 11/2011 | Jones et al. | |
| 2011/0304686 A1 | 12/2011 | Qui et al. | |
| 2011/0314014 A1 | 12/2011 | Junginger et al. | |
| 2012/0008753 A1* | 1/2012 | Burnett et al. | 379/88.17 |
| 2012/0036566 A1 | 2/2012 | Nicholson et al. | |
| 2012/0084254 A1* | 4/2012 | Richards et al. | 707/609 |
| 2012/0163577 A1 | 6/2012 | Buford et al. | |
| 2012/0180105 A1 | 7/2012 | Downes et al. | |
| 2012/0185391 A1 | 7/2012 | Sirota | |
| 2012/0190325 A1* | 7/2012 | Abu-Hakima et al. | 455/404.2 |
| 2012/0203913 A1 | 8/2012 | Pujare et al. | |
| 2012/0216267 A1 | 8/2012 | Austel et al. | |
| 2012/0254326 A1* | 10/2012 | Bellan et al. | 709/206 |
| 2012/0254373 A1 | 10/2012 | Pujare et al. | |
| 2012/0274725 A1 | 11/2012 | Robertson | |
| 2012/0303672 A1 | 11/2012 | Anand et al. | |
| 2013/0007150 A1* | 1/2013 | Hertz et al. | 709/206 |
| 2013/0065618 A1 | 3/2013 | Long et al. | |
| 2013/0066871 A1 | 3/2013 | Fletcher | |
| 2013/0067365 A1 | 3/2013 | Shruf et al. | |
| 2013/0132285 A1* | 5/2013 | Richards et al. | 705/300 |
| 2013/0151709 A1 | 6/2013 | Luna | |
| 2013/0160105 A1 | 6/2013 | Huang et al. | |
| 2013/0198386 A1 | 8/2013 | Srikanth et al. | |
| 2013/0246640 A1 | 9/2013 | Ahrens | |
| 2013/0268920 A1 | 10/2013 | Ursal et al. | |
| 2014/0148934 A1* | 5/2014 | Manley et al. | 700/94 |
| 2014/0280931 A1* | 9/2014 | Braun et al. | 709/225 |
| 2014/0280932 A1* | 9/2014 | Braun et al. | 709/225 |
| 2014/0282816 A1 | 9/2014 | Xie et al. | |
| 2014/0282934 A1* | 9/2014 | Miasnik et al. | 726/5 |
| 2014/0289303 A1 | 9/2014 | Tarricone et al. | |
| 2014/0337954 A1 | 11/2014 | Ahmed et al. | |
| 2014/0359027 A1 | 12/2014 | Pujare et al. | |
| 2015/0039700 A1 | 2/2015 | West et al. | |

OTHER PUBLICATIONS

Ennai, Anuraj, et al., "MobileSOA: A Service Oriented Web 2.0 Framework for Context-Aware, Lightweight and Flexible Mobile

(56) References Cited

OTHER PUBLICATIONS

Applications", EDOCW 2008, Munich, Germany, Sep. 16, 2008, pp. 345-352.*
Beuchelt, G., et al., "RESTful Services Guidance for Developers v 1.0", MITRE Technical Report MTR100093, Apr. 2010, 46 pages.*
Microsoft Computer Dictionary, 5th Edition, Microsoft Press, Redmond, WA, © 2002, p. 474.*
"Web Application Description Language", Wikipedia, downloaded from en.wikipedia.org/wiki/Web_Application_Description_Language on Feb. 2, 2015, pp. 1-3.*
"Representational state transfer", Wikipedia, downloaded from en.wikipedia.org/wiki/Representational_state_transfer on Feb. 2, 2015, pp. 1-5.*
Cisco Unified Communications System Description—Release 8.5(1), Cisco Systems, Inc., San Jose, CA, © 2010, 90 pages.*
"Chapter 21—Voice Messaging", Cisco Unified Communications System Description—Release 9.0 SRND, Cisco Systems, Inc., San Jose, CA, Apr. 30, 2013, 44 pages.*
"Office-LinX Cloud Connect Edition for Cisco Unity Connection", Esna Technologies, Inc., Richmond Hill, ON, Canada, © 2012, 2 pages.*
Levy, Brian, "The common capability approach to new service development", BT Technology Journal, vol. 23, No. 1, Jan. 2005, pp. 48-54.*
Microsoft Computer Dictionary, 5th Edition, Microsoft Press, Redmond, WA, (c) 2002, p. 16.*
Yeh, Yi-Shiung, et al., "Applying lightweight directory access protocol service on session certification authority", Computer Networks, vol. 38, Issue 5, Apr. 2002, pp. 675-692.*
PCT International Search Report issued Oct. 22, 2014 in corresponding PCT Application No. PCT/US2014/041595 filed Jun. 9, 2014, inventor Pujare, Sanjay et al.
Bossoli, Francesca, et al.; "Proposal for Common Interoperability Protocol", Online, Aug. 30, 2003, pp. 1-3, XP002283230.
"Nimsoft® Monitor™ Server, Getting Started Guide version 6.00" (Jun. 29, 2012 to Nimsoft), 46 pages.
Technical Specification "Interdomain Federation for IM and Presence Service on Cisco Unified Communications Manager, Release 9.0(1)", Cisco Systems, Inc., San Jose, CA, Jul. 18, 2012, 188 pages.
Supplementary European Search Report issued Aug. 20, 2014 in corresponding EP Application No. EP 11862613 filed Apr. 26, 2011, inventor Pujare, Sanjay et al., 2 pages.
PCT International Search Report issued Jan. 2, 2015 in corresponding PCT Application No. PCT/US2014/059944 filed Oct. 9, 2014, inventor Pujare, Sanjay et al., 9 pages.
PCT International Search Report issued May 23, 2012 in corresponding PCT Application No. PCT/US2012/024014 filed Feb. 6, 2012, inventor Pujare, Sanjay et al., 3 pages.

* cited by examiner

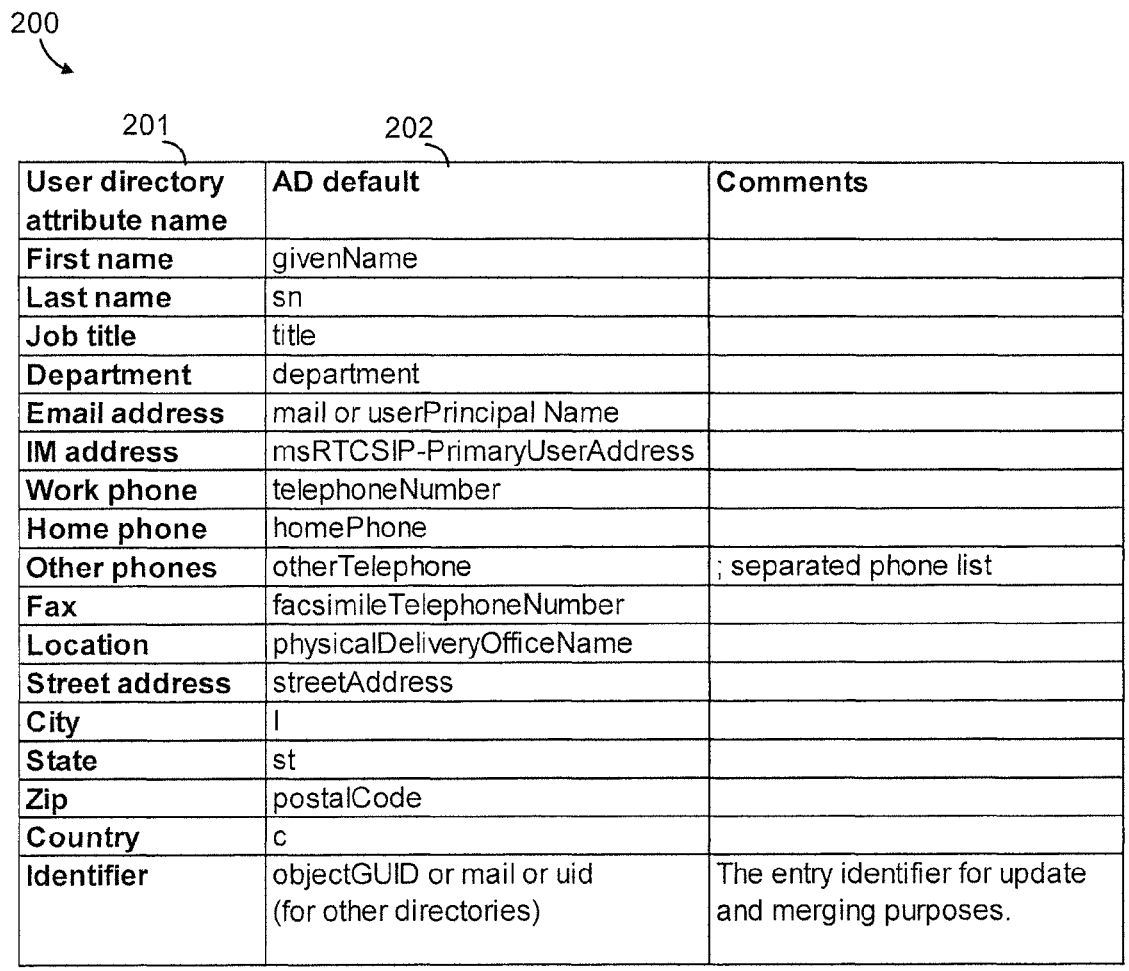

| User directory attribute name | AD default | Comments |
|---|---|---|
| First name | givenName | |
| Last name | sn | |
| Job title | title | |
| Department | department | |
| Email address | mail or userPrincipal Name | |
| IM address | msRTCSIP-PrimaryUserAddress | |
| Work phone | telephoneNumber | |
| Home phone | homePhone | |
| Other phones | otherTelephone | ; separated phone list |
| Fax | facsimileTelephoneNumber | |
| Location | physicalDeliveryOfficeName | |
| Street address | streetAddress | |
| City | l | |
| State | st | |
| Zip | postalCode | |
| Country | c | |
| Identifier | objectGUID or mail or uid (for other directories) | The entry identifier for update and merging purposes. |

Figure 2

| User Attribute | Data type | Nullability | Default |
|---|---|---|---|
| ID | GUID | not null | newid() |
| last updated | timestamp | not null | |
| First Name | varchar(255) | not null | |
| Middle Name | varchar(255) | null | |
| Last Name | varchar(255) | not null | |
| Job Title | varchar(255) | not null | Unspecified |
| Job Role | varchar(255) | not null | Unspecified |
| Company Name | varchar(255) | not null | Unspecified |
| Department | varchar(255) | null | |
| Email (Primary) | varchar(255) | not null | |
| Email (Bloomberg) | varchar(255) | null | |
| TR Messenger ID | varchar(255) | null | |
| IM Address | varchar(255) | not null | |
| Phone Number | varchar(255) | not null | |
| Mobile Number | varchar(255) | null | |
| Fax | varchar(255) | null | |
| Address: Address 1 | varchar(255) | not null | |
| Address: Address 2 | varchar(255) | null | |
| Address: City | varchar(255) | not null | Unspecified |
| Address: State/Province | varchar(255) | not null | Unspecified |
| Address: Country | varchar(255) | not null | U.S.A. |
| Address: ZIP/Postal Code | varchar(255) | not null | 00000' |
| Business Area | varchar(255) | null | |
| Profile Type | varchar(255) | null | |
| Community/Group | varchar(255) | null | |
| User Picture | binary | null | |
| Custom_attr1 | varchar(255) | null | |
| Custom_attr2 | varchar(255) | null | |
| Custom_attr3 | varchar(255) | null | |
| Custom_attr4 | varchar(255) | null | |
| Custom_attr5 | varchar(255) | null | |
| Custom_attr6 | varchar(255) | null | |
| Custom_attr7 | numeric(19,0) | null | |
| Custom_attr8 | numeric(19,0) | null | |
| Custom_attr9 | datetime | null | |
| Custom_attr10 | datetime | null | |

| Domain Attribute | Data type | Nullability | Default value |
|---|---|---|---|
| ID | GUID | null | |
| NAME | VARCHAR(255) | null | |
| ADDRESS | VARCHAR(255) | null | |
| CITY | VARCHAR(255) | null | |
| COUNTRY | VARCHAR(255) | null | |
| STATE_PROVINCE | VARCHAR(255) | null | |
| POSTAL CODE | VARCHAR(255) | null | |
| ADMINISTRATOR | GUID | null | |
| LASTUPDATED | TIMESTAMP | null | |
| UPDATE_SUCCESSFUL | SMALLINT | null | |

| Role Attribute | Data type | Nullability | Default value |
|---|---|---|---|
| ID | INT | | |
| OWNER | GUID | not null | |
| NAME | VARCHAR(255) | not null | |

| Access Attribute | Data type | Nullability | Default value |
|---|---|---|---|
| GRANTEE | GUID | not null | |
| GRANTOR | GUID | null | |
| DOMAIN_ID | INT | null | |
| DIRECTORY_ENTRY | GUID | null | |
| ROLE_ID | INT | null | |
| PERMISSIONTYPE | SMALLINT | null | |
| GRANT_ON_GRANT | SMALLINT | | 1 |

| User Network Attribute | Data type | Nullability | Default value |
|---|---|---|---|
| NETWORK_OWNER | GUID | not null | |
| NETWORK_MEMBER | GUID | not null | |

| Activity Attribute | Data type | Not null? | Default value |
|---|---|---|---|
| USER ID | GUID | Y | |
| TIMESTARTED | TIMESTAMP | N | |
| ACTIVITY | VARCHAR(255) | Y | |
| ISBULK | TINYINT | Y | 0 |
| SUCCESS | TINYINT | Y | 1 |
| USERCOUNT | BIGINT | Y | 1 |
| SEARCHTYPE | VARCHAR(255) | N | |
| TIMESPENT | INT | N | |
| ERROR | VARCHAR(255) | N | |

| Configuration Attribute | Data type | Nullability | Default value |
|---|---|---|---|
| ID | INT | not null | |
| NAME | VARCHAR(255) | not null | |
| LASTUPDATED | TIMESTAMP | not null | |
| VALUE | VARCHAR(255) | null | |
| DEFAULT | VARCHAR(255) | null | |
| MIN | VARCHAR(255) | not null | |
| MAX | VARCHAR(255) | not null | |
| PROTECTED | SMALLINT | | 0 |

Figure 14

USER DIRECTORY SYSTEM FOR A HUB-BASED SYSTEM FEDERATING DISPARATE UNIFIED COMMUNICATIONS SYSTEMS

FIELD

The present system and method relate to unified communications (UC) systems. In particular, the present system and method relate to providing a user directory system to a hub-based system federating disparate unified communications systems.

BACKGROUND

A unified communications (UC) system generally refers to a system that provides users with an integration of communication services. Users typically connect to the UC system through a single client to access the integrated communications services. The integrated communications services may include real-time services, such as instant messaging (IM), presence notifications, telephony, and video conferencing, as well as non real-time services, such as email, SMS, fax and voicemail.

Organizations, such as corporations, businesses, educational institutions, and government entities, often employ UC systems to enable internal communication among its members in a uniform and generally cost-efficient manner. In addition, organizations may employ UC systems for communicating with trusted external entities.

Currently, a number of third-party developers offer various US applications for implementing UC systems. The various applications include MICROSOFT® Office Communications Server (OCS), IBM® SAMETIME® (ST), GOOGLE® Apps, and CISCO JABBER®. Because there is no industry standard regarding UC systems, issues of incompatibility arise when a user from one UC system needs to search user information of another user from a UC system. In one case, a corporation or business that employs a particular UC system may desire to contact employees who employ a different UC system. Or in the case of internal communication, when an organization that employs a particular UC system "A" merges with another organization that employs a UC system "B", the ability for users on system "A" to search user information of users on system "B" is often desirable. Nevertheless, the incompatibility of the UC systems often makes searching of user information in a different UC system difficult or impossible to implement. Furthermore, even if two UC systems are of a common type, users from one UC system may not be able to search user information of users on a second UC system due to a lack of access to the second UC system.

SUMMARY

A user directory system for a hub-based system federating disparate unified communications systems is disclosed. According to one embodiment, the computer-implemented method includes connecting a first unified communications system and a second unified communications system through a federation server, synchronizing a directory entry from a directory of the first unified communications system to a user directory, where the directory entry contains user information of the first unified communications system, and providing the second unified communications system with an access to the directory entry.

The above and other preferred features, including various novel details of implementation and combination of events, will now be more particularly described with reference to the accompanying figures and pointed out in the claims. It will be understood that the particular methods described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying figures, which are included as part of the present specification, illustrate the presently preferred embodiments of the present invention and together with the general description given above and the detailed description of the preferred embodiments given below serve to explain and teach the principles of the present invention.

FIG. 2 illustrates a table of exemplary user directory attributes that are mapped from an active directory (AD), according to one embodiment.

FIG. 8 illustrates an exemplary user entry table, according to one embodiment.

FIG. 9 illustrates an exemplary domain entry table, according to one embodiment.

FIG. 10 illustrates an exemplary role entry table, according to one embodiment.

FIG. 11 illustrates an exemplary access control entry table, according to one embodiment.

FIG. 12 illustrates an exemplary user network entry table, according to one embodiment.

FIG. 13 illustrates an exemplary data activity log entry table, according to one embodiment.

FIG. 14 illustrates an exemplary data configuration entry table, according to one embodiment.

The figures are not necessarily drawn to scale and elements of similar structures or functions are generally represented by like reference numerals for illustrative purposes

DETAILED DESCRIPTION

Figure 1:
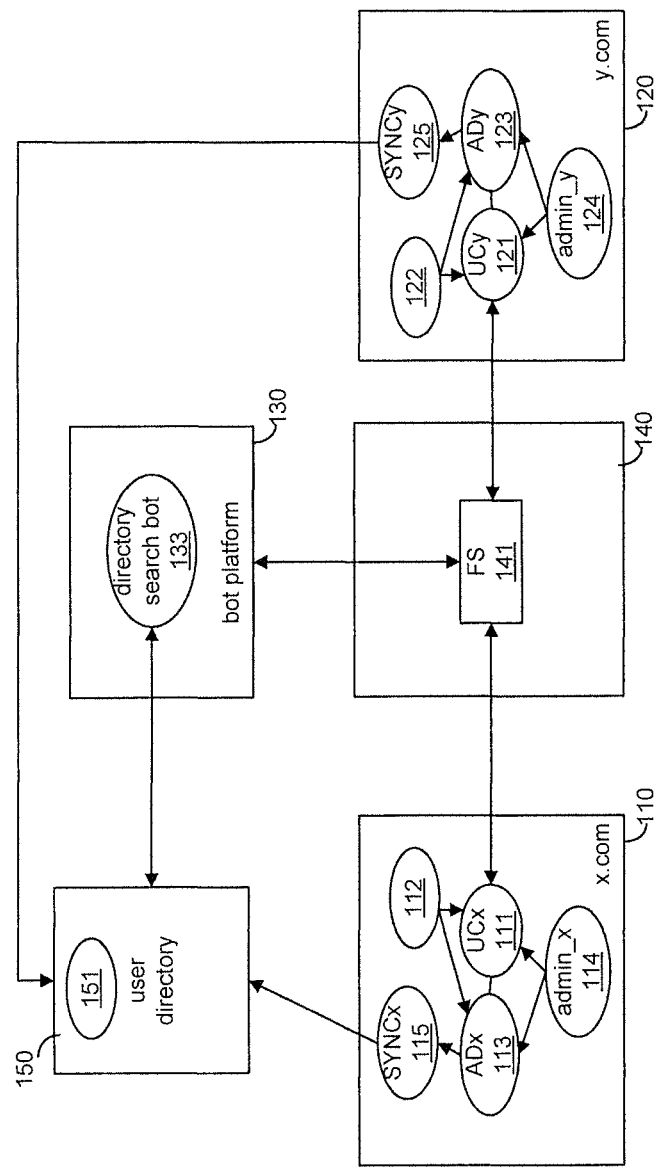
FIG. 1 illustrates a block diagram of a user directory for UC systems that are interconnected through a hub, according to one embodiment.

A user directory for a hub-based system federating disparate unified communications systems is disclosed. According to one embodiment, the computer-implemented method includes connecting a first unified communications system and a second unified communications system through a federation server, synchronizing a directory entry from a directory of the first unified communications system to a user directory, where the directory entry contains user information of the first unified communications system, and providing the second unified communications system with an access to the directory entry.

Each of the features and teachings disclosed herein can be utilized separately or in conjunction with other features and teachings to provide a method for providing a user directory system for a hub-based system federating disparate unified communications systems. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present system and method provide a user directory on an independent directory server for users from one or more domains using the same or different types of UC systems that are federated through a hub. The user directory provides a user with access to user information belonging to a user of a disparate domain. In one embodiment, the user directory provides a web-based user interface to allow users to access the user directory. Users perform a search for other users via the web-based user interface using various search criteria (e.g., name, title, and group). Users may also perform a search through various means, for example, a directory search bot, a plug-in on a UC client, a connection between the hub system and the user directory, and a connection between the domain and the user directory. According to one embodiment, users from a first domain are able to access other users' information from a second domain and the first domain after both these domains are registered with the user directory.

The present system and method allow a user to maintain and edit his/her user information in the user directory subject to various access controls. According to one embodiment, the user directory allows a user to create and maintain a user network and invite other users to join his/her user network.

The present system and method provide an administrative interface for a user (e.g., a domain administrator). The user uploads data from an active directory in his/her domain to the user directory and manages the uploaded data in the user directory. The present system and method provide a synchronization tool to support an initial upload of data and periodic data synchronization from the active directory to the user directory.

FIG. 1 illustrates a block diagram of an exemplary system that implements a user directory for UC systems that are interconnected through a hub, according to one embodiment. While FIG. 1 only illustrates two interconnecting UC systems 111 and 121, the present system can interconnect and support any number of UC systems.

The hub 140 connects each UC system 111 and 121 to the hub and establishes communication between each UC system 111 and 121 to the hub 140 through a domain provisioning process. During domain provisioning, a hub administrator configures the hub 140 to allow a domain administrator 114 to configure the UC system 111 based on the specifics associated with the UC system 111. The hub 140 further establishes a federation link between the UC systems 111 and 121 to allow a user 112 on the UC system 111 to communicate or interact with a user 122 on the UC system 121 as if both the users 112 and 122 are served by the same UC system in the same domain.

Co-pending U.S. patent application Ser. No. 13/077,710 entitled "Hub Based Clearing House For Interoperability Of Distinct Unified Communications Systems" and U.S. patent application Ser. No. 13/153,025 entitled "Method And System For Advanced Alias Domain Routing," incorporated by reference herein, describe a highly scalable, hub-based system for interconnecting, or federating, any number of disparate UC systems. The hub-based system includes a hub that allows users on one UC system to communicate with users of another UC system as if they were served by the same UC in the same domain, whether the UC systems are of the same or different type.

The hub 140 acts as a central station for translating incoming data from one UC system (e.g., 111) to a language that is recognized by the UC application implemented by another UC system (e.g., 121) or an automated platform 130 (herein referred to as a bot platform). In the case where the UC systems 111 and 121 are running a common protocol, no translation is required and the hub 140 routes a message directly from one UC system (e.g., 111) to another UC system (e.g., 121). Similarly, when a UC system 111 or 121 and the bot platform 130 are running a common protocol, the hub 140 routes a message directly from the UC system 111 or 121 to the bot platform 130.

The federation server (FS) 141 in the hub 140 has a hardware aspect that includes a physical network card connection that provides a physical pathway for data to flow into and out of the FS 141 (e.g., data flowing from the UC system 111 to the UC system 121). The FS 141 further includes a software aspect that has a listening loop to listen on the physical connection and wait for incoming data, and a function that can be called out by the FS 141 when data is ready to be sent out from a network card of the FS 141.

It should be noted that although actions and/or functions of elements in domain x.com 110 are described in the examples below, similar actions and/or functions can also be applied to the corresponding elements in domain y.com 120. In FIG. 1, the user 112 corresponds to the user 122, the domain administrator 114 corresponds to the domain administrator 124, the active directory (AD) 113 corresponds to the AD 123, the synchronization tool 115 corresponds to the synchronization tool 125 and the UC system 111 corresponds to the UC system 121.

According to one embodiment, the user 112 of domain x.com 110 accesses the user directory 150 to perform various functions such as viewing, editing and updating his/her own user information in the user directory 150, searching the user directory 150 for information regarding other users in his/her domain x.com 110 and other domains (e.g., the user 122 in domain y.com 120), inviting other users to join his/her user network, granting privileges to other users who have accepted the invitation to and joined his/her user network and requesting to join another user network. The user 112 may access the user directory 150 using various means, for example by communicating with a directory search bot 133, and accessing a web user interface for the user directory 150. The user 112 may further access the web user interface to create and maintain his/her own profile (e.g., upload his/her own photo) and a user network.

According to one embodiment, the user directory administrator 151 provides administration of the web user interface of the user directory 150. to maintain functioning of the user directory 150. The user directory administrator 151 creates and administers end user accounts, including granting/revoking access privileges to the domain administrator 114 and the user 112. The user directory administrator 151 performs other administrative tasks such as adding, deleting and editing directory entries in the user directory 150, bulk loading directory entries, backing up and restoring the user directory 150, importing and exporting directory entries, configuring and administering the user directory 150, generating reports (e.g., usage reports, search query reports, statistical reports, and performance reports) of the user directory 150.

According to one embodiment, the domain administrator 114 of domain x.com 110 administers domain 110 and the user 112 in domain 110. The domain administrator 114 imports/exports directory entries to/from the AD 113 in domain x.com 110, adds/deletes/modifies directory entries in the AD 113, grants/revokes access privileges to directory entries in the AD 113 for the user 112 and generates reports on the user 112 in domain 110.

The domain administrator 114 of domain x.com 110 registers with the user directory 150 by creating an account via a web user interface of the user directory 150. In one embodiment, either one or both the UC systems 111 and 121 are not federated with the hub 140 prior to the domain administrator 114 registering with the user directory 150. After the domain administrator 114 successfully registers and logs into the user directory 150, the user directory 150 creates a synchronization key. The domain administrator 114 is then able to bulk load directory entries from the AD 113 to the user directory 150.

According to one embodiment, domain x.com 110 includes a synchronization tool 115 that extracts directory information from the AD 113 and converts the directory information into a known file format for loading into the user directory 150. When the synchronization tool 115 invokes an application-programming interface of the user directory 150 or uploads directory entries from the AD 113 to the user directory 150, the synchronization tool 115 passes the synchronization key to the user directory 150 so that the user directory 150 authorizes these calls. According to one embodiment, the user directory 150 generates a transport layer security (TLS) key/pair for the synchronization tool 115 to provide to the user directory 150 as authentication. After an initial bulk load, the domain administrator 114 uses a scheduler of the synchronization tool 115 to perform periodic synchronization of directory entries from the AD 113 to the user directory. The domain administrator 114 may also use any scheduling application software known to one ordinary skilled in the art to perform periodic synchronization. Alternatively, the domain administrator 114 manually uses the synchronization tool 115 to update directory entries from the AD 113 with the user directory 150. According to one embodiment, the domain administrator 114 may select directory entries to be updated to the user directory 150. The synchronization tool pushes a file that includes the selected directory entries to the user directory 150. The file that is generated for upload to the user directory 150 provides information regarding directory entries that are inserted, updated and/or deleted. The domain administrator 114 may choose to update directory entries from the AD 113 by performing a full bulk load or an incremental update each time during synchronization.

According to one embodiment, the user directory 150 merges (e.g., insert, update and delete) the directory entries that are pushed from the synchronization tool 115 into the user directory 150. In another embodiment, the user directory 150 deletes the existing directory entries in the user directory 150 and replaces with directory entries that are pushed from the synchronization tool 115. According to another embodiment, directory entries from the AD 113 are loaded to the user directory 150 via files or other synchronization mechanisms.

According to one embodiment, the synchronization tool 115 provides the domain administrator 114 with a configuration file to customize according to AD 113. The domain administrator 114 customizes the configuration attributes of the configuration file such as attribute mapping according to the AD type, AD connection information, AD authentication information, simple mail transfer protocol (SMTP) configuration attributes, restriction query string, and exclusion rules.

FIG. 2 illustrates a table of exemplary user directory attributes that are mapped from an active directory (AD), according to one embodiment. The synchronization tool 115 fetches AD default directory entries in column 202 from the AD 113 and maps them to corresponding user directory attributes in column 201 for uploading to the user directory 150. The domain administrator 114 may customize the attribute mapping for his/her AD type in the configuration file by selecting the corresponding attributes to map against the directory entries in the AD 113. The domain administrator 114 may further add and delete attributes in the configuration file. If additional attributes are created in the user directory 150, the domain administrator 114 may update the configuration file to map the additional directory entries to the additional attributes for the user directory 150.

The domain administrator 114 customizes the AD connection information in the configuration file such as the domain name system (DNS) of the domain controller and port number for domain 110. According to one embodiment, the same domain controller is used for subsequent incremental synchronization of the AD 115 since some of the change logs are not consistent among domain controllers.

The domain administrator 114 may further customize the AD authentication information in the configuration file such as the user name/password that is used to connect and search the AD 113. For instance, when incremental synchronization is performed on the AD 113, access to additional containers (e.g., deleted items) in the AD 113 is required. According to one embodiment, the domain administrator 114 uses a secret key to encrypt the password and then adds the encrypted password into the configuration file.

The domain administrator 114 may further customize the SMTP configuration attributes in the configuration file such as SMTP server information and a list of user addresses that are informed (e.g., by email) upon completion of synchronization. The domain administrator 114 may further customize a restriction query string (e.g., lightweight directory access protocol (LDAP) query format) that is used to restrict a search of certain directory entries in the AD 113. The domain administrator 114 may further customize the exclusion rules in the configuration files including a set of rules to exclude certain users from the restriction query string.

According to one embodiment, the synchronization tool 115 provides validation by connecting to the AD 113 and verifying the configuration file and verifying access to specific containers (e.g., deleted items) in the AD 113. In one embodiment, the synchronization tool 115 provides the domain administrator 114 with a sample view of directory entries along with the fetched attributes so that the domain administrator 114 can verify the accuracy of the attribute mapping. The domain administrator 114 may preview the file containing the directory entries to be sent to the user directory 150.

According to one embodiment, the synchronization tool 115 provides the domain administrator 114 with a summary of directory entries that are going to be transferred from the AD 113 to the user directory 150. The summary of directory entries further provides the details of directory records that are going to be added to, modified, and/or deleted from the user directory 150. The summary of directory entries may be provided using a difference logic in the synchronization tool 115 or the user directory 150.

According to one embodiment, the difference logic is part of the synchronization tool 115 and is applied while querying the LDAP so that the summary results only contain the incremental data. In this case, only directory entries that have been changed since the previous query are pushed to the user directory 150. In another embodiment, the difference logic in the synchronization tool 115 is applied after querying the entire AD 113. In this case, a local cache of the data from the user directory 150 is maintained and stored in the synchronization tool 115, and then the difference logic is applied between the local cache data and the AD 113 data. The synchronization tool 115 updates the local cache from the user directory 150 periodically to avoid losing the local cache.

According to another embodiment, the difference logic is part of the user directory 150 and is applied after receiving all the data that is pushed from the synchronization tool 115. In this case, the synchronization tool 115 performs a full upload of the data to the user directory 150.

Figure 3:
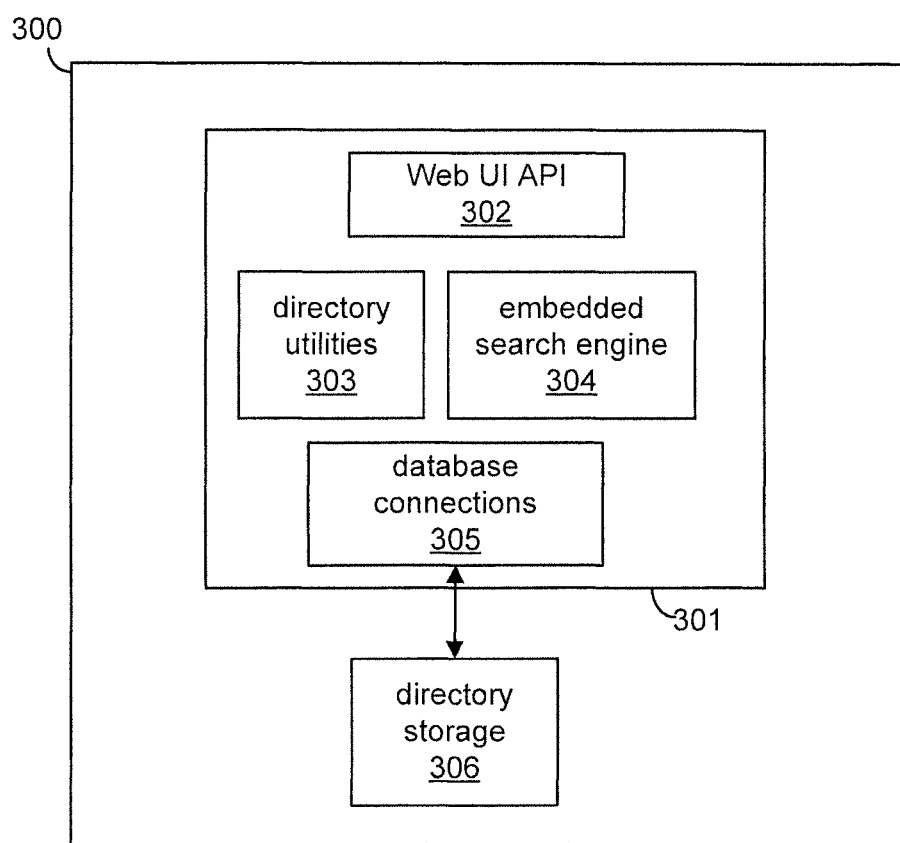
FIG. 3 illustrates a block diagram of an exemplary architecture of a user directory with an embedded search engine, according to one embodiment.

FIG. 3 illustrates a block diagram of an exemplary architecture of a user directory with an embedded search engine, according to one embodiment. The user directory 300 includes a directory engine 301 that provides an application programming interface (API) 302 to support a web user interface (not shown) for accessing the user directory 300. According to one embodiment, the API 302 is representational state transfer (REST) based services described by web application description language (WADL) implementation. The API 302 provides API calls to the directory engine 301 when a user performs a variety of features at the web user interface such as user login, updating user information, creating and managing a user network, requesting to join another user network, performing search queries, bulk loading/bulk updating directory entries, generating usage reports and access control.

According to one embodiment, the API 302 makes use of a user name (e.g., email address) and password to authenticate a user, fetches user information including user network information from a directory storage 306, and sends the user information to the web user interface. In another embodiment, the API 302 allows a user to interactively update some fields of the user information after logging in via the web user interface. The API 302 provides an API request to the directory utilities 303 in the directory engine 301 so that the directory utilities 303 updates the user information and stores the update in the directory storage 306.

According to one embodiment, when a user (user A) provides an invitation request to invite a second user (user B) in the user directory 300 to join his/her user network via the web user interface, the API 302 forwards the invitation request to the user B in the user directory 300. User B may belong to the same or a different domain from user A. After user B accepts the invitation, the API 302 provides an API request to the directory utilities 303 to update the user network by adding the new entry of the user B to user A's user network and storing this information in the directory storage 306.

According to one embodiment, a user performs a search query via the web user interface. The API 302 provides an API request to perform the search query on the embedded search engine 304, retrieves the search results, and sends them to the user via the web user interface.

According to one embodiment, as described above, a user (e.g., a domain administrator) from a domain provides a bulk load and bulk update of entries as a data file to the user directory 300 from an active directory (AD) in the domain via the web user interface. A synchronization tool at the user's UC system extracts directory entries into the data file that has a format suitable for upload into the user directory 300. The API 302 provides a request for the directory utilities 303 to import directory entries from the data file and store the directory entries on the directory storage 306 running on a server (e.g., structured query language (SQL)) via database connections 305. According to one embodiment, the database connections 305 are based on Java database connectivity (JDBC). The directory utilities 303 may further export directory entries through a data file and generate reports to report an upload to the user directory 300. The report is displayed via the web user interface 330 or sent to the user in a file format. In another embodiment, the API 302 controls access privileges of a user to access bulk operations (e.g., bulk load, and bulk update), updates, searches, and reports. For instance, the API 302 grants an access privilege to domain administrators to perform bulk operations for their domains, and a user to search for other users in certain domains, including the user's domain.

The API 302 of the directory engine 301 communicates with the directory storage 306 to perform several functions such as authenticating a user, fetching directory entries and user network information from the directory storage 306, updating directory entries in the directory storage 306, bulk loading and bulk updating of directory entries into the directory storage 306, managing user networks stored in the directory storage 306, managing access controls, storing activity logs and generating reports. According to one embodiment, a field-based or column-based search query is satisfied by direct queries with the server running the directory storage 306.

The directory engine 301 further includes an embedded search engine having a storage for indexing. When the API 302 provides an API call to upload new or updated directory entries from the data file to the directory storage 306, the same API call triggers an incremental execution of indexing by the embedded search engine 304. According to one embodiment, the embedded search engine 304 employs Apache's Lucene search technology.

Figure 4:
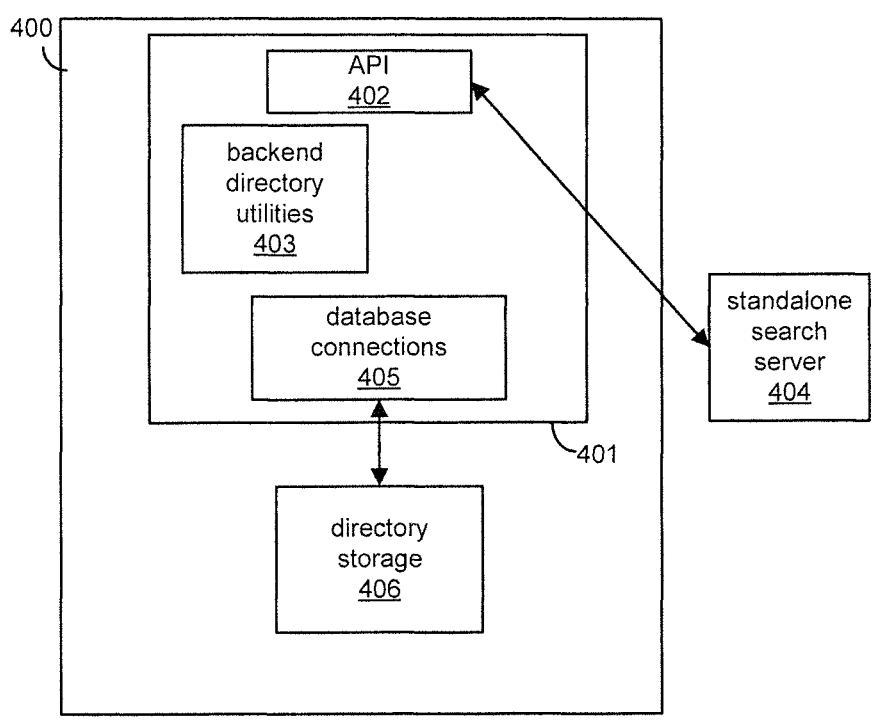
FIG. 4 illustrates a block diagram of an exemplary architecture of a user directory with a standalone search server, according to one embodiment.

FIG. 4 illustrates a block diagram of an exemplary architecture of a user directory with a standalone search server, according to one embodiment. The directory engine 401 of user directory 400 includes an API 402 that supports a web user interface for accessing the user directory 400. The API 402 provides API calls when a user performs a variety of features at the web user interface such as user login, updating user information, creating and managing a user network, requesting to join another user network, performing search queries, bulk loading/bulk updating directory entries, generating usage reports and access control. As described above, a user (e.g., a domain administrator) from a domain provides a bulk load and bulk update of entries as a data file to the user directory 400 from an active directory (AD) in the domain via the web user interface. The API 402 provides an API request to the directory utilities 403 to import directory entries from the data file and store the directory entries on the directory storage 406 running on a server (e.g., structured query language (SQL)) via database connections 405. According to one embodiment, the database connections 405 are based on Java database connectivity (JDBC). The directory utilities 403 may further export directory entries through a data file and generate reports to report an upload to the user directory 400. The report is displayed via the web user interface 330 or sent to the user in a file format. The API 402 communicates with the standalone search server 404 to support search queries. The standalone search server 404 includes a storage for indexing. When the API 402 provides an API call to upload new or updated directory entries from the data file to the directory storage 406, the same API call triggers an incremental execution of indexing by the standalone search server 404. According to one embodiment, the standalone search server 404 is a standalone ElasticSearch/Solr search server employing Apache's Lucene search technology. The standalone search server 404 requires less coding for quicker implementation by creating search indexes and supporting search query features.

Apache Solr is a standalone enterprise search server with a REST-like API. Data from the directory storage 406 is transferred to the standalone search server 404, also known as indexing via various formats (e.g., extensible markup language (XML), javascript object notation (JSON), and binary over hypertext transfer protocol (HTTP)). For example, a search query is submitted to the standalone search server 404 via HTTP GET and search results are received in XML, JSON or HTTP format.

Figure 5:
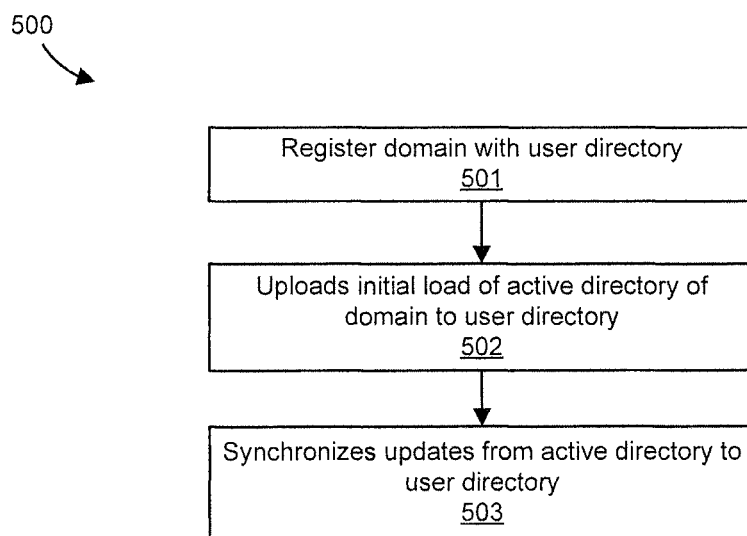
FIG. 5 illustrates a flow chart of an exemplary process of uploading an active directory from a domain to a user directory, according to one embodiment.

FIG. 5 illustrates a flow chart of an exemplary process of uploading an active directory from a domain to a user directory, according to one embodiment. The process 500 begins with a user registering a domain of a UC system with the user directory (at 501). According to one embodiment, the UC system may be connected to a hub by domain provisioning prior to registering the domain with the user directory. An initial load of the active directory of the domain is uploaded to the user directory (at 502). According to one embodiment, data from the active directory is uploaded using a synchronization tool that resides in the domain. Updates from the active directory to the user directory are synchronized (at 503). A scheduler of the synchronization tool 115 performs periodic synchronization of directory entries from the active directory to the user directory. Alternatively, a domain administrator manually uses the synchronization tool to update directory entries from the active directory with the user directory.

Figure 6:
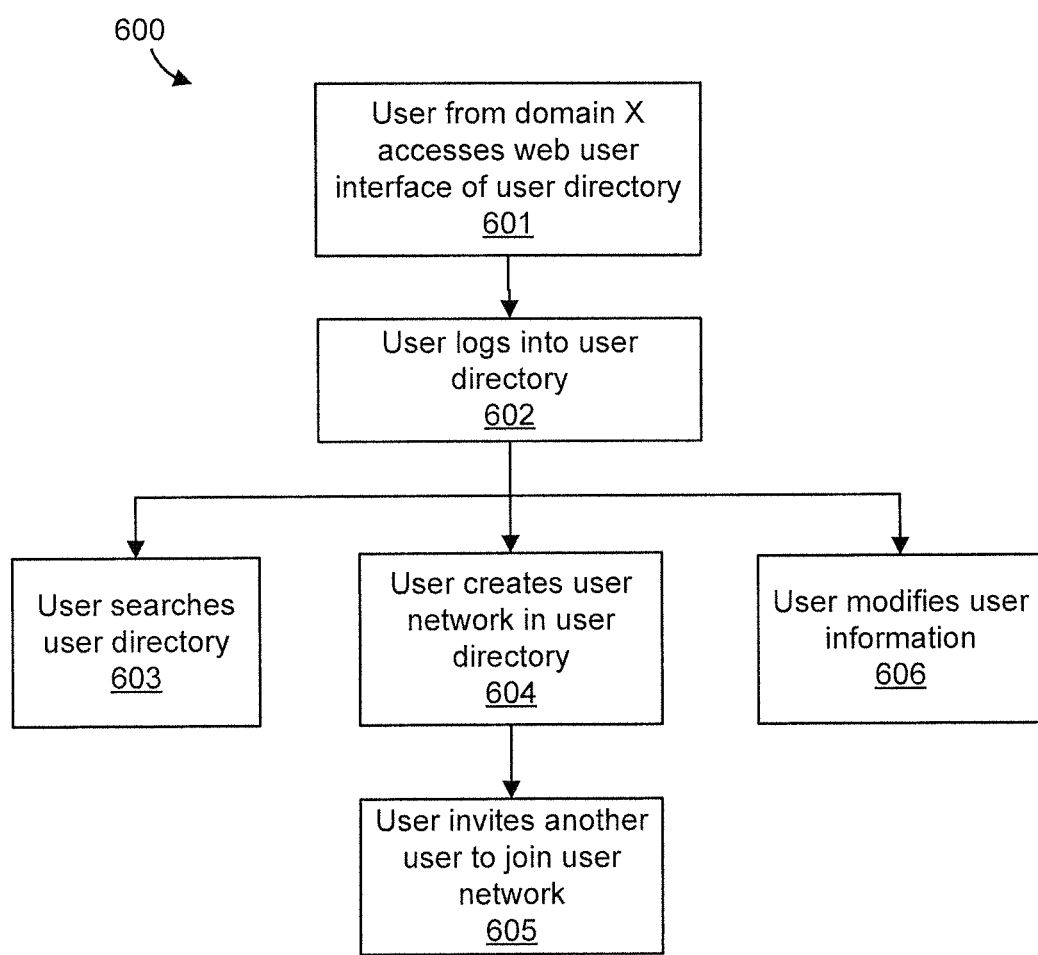
FIG. 6 illustrates a flow chart of an exemplary process for accessing a web user interface of a user directory, according to one embodiment.

FIG. 6 illustrates a flow chart of an exemplary process for accessing a web user interface of a user directory, according to one embodiment. The process 600 begins when the user from domain X accesses a web user interface for the user directory (at 601). After the user logs into the user directory (at 602), the user can search the user directory for other users (at 603), create a user network in the user directory (at 604), and modify his/her user information (at 606). The user can further invite another user to join his/her user network. (at 605).

Figure 7:
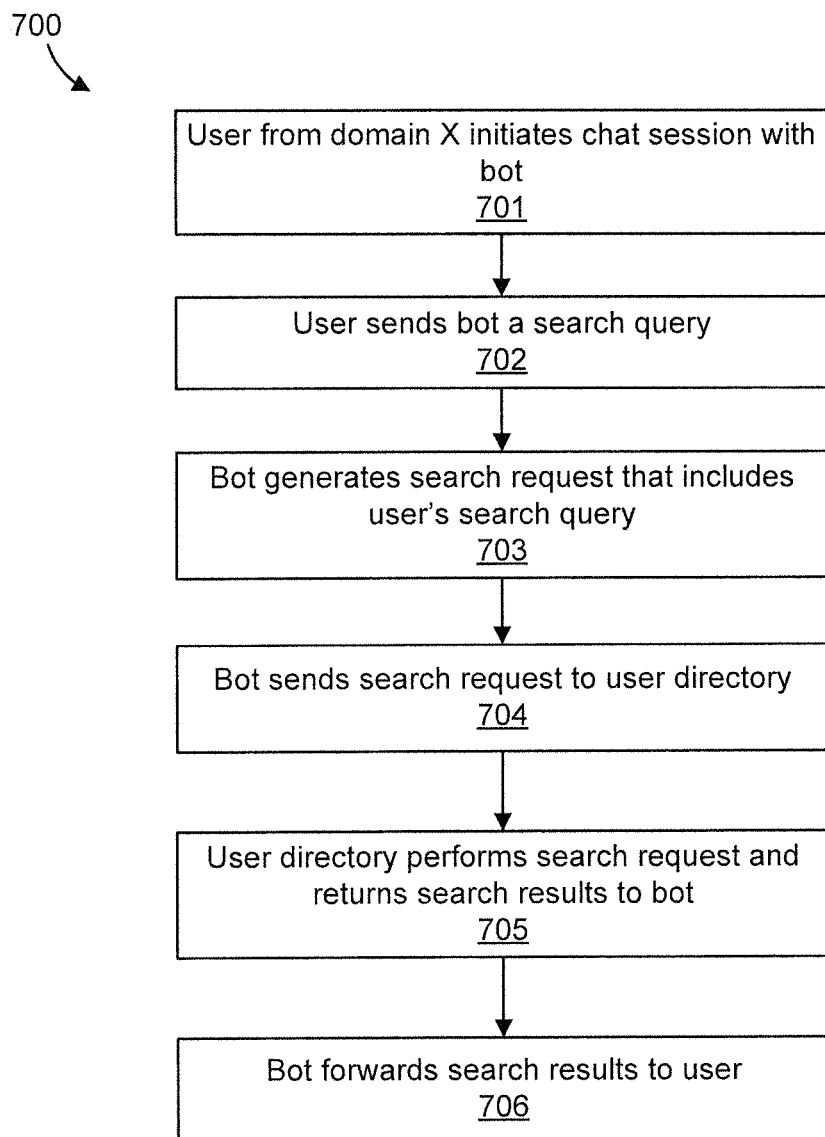
FIG. 7 illustrates a flow chart of an exemplary process for searching the user directory using a directory search automated application (herein referred to as a bot), according to one embodiment.

FIG. 7 illustrates a flow chart of an exemplary process for searching the user directory using a directory search bot, according to one embodiment. The process 700 begins when the user from domain X initiates a chat session with the directory search bot (at 701). For instance, a user named Peter from a domain acme.com has a user address peter@acme.com. Peter adds the chat address (e.g., dirbot@nxpbots.com) of the directory search bot to his contact list and creates a chat session with the directory search bot. According to one embodiment, the user provides authentication to his/her domain of a UC system prior to initiating the chat session with the directory search bot.

The user proceeds to send the directory search bot a search query (at 702). The user may provide a search query for another user by entering a search term into the chat session. A search term includes one or more of, but is not limited to, a first name, a last name, a company name and an email address. For instance, if the user wants to search for another user with a first name John, a last name Smith, a company name Nextplane and user address user1@foo.com, the user may enter a search query:

search user1@foo.com

The user may also enter a search query:

search John Smith Nextplane

The directory search bot generates a search request that includes the user's search query (at 703). The directory search bot sends the search request to the user directory (at 704). The user directory performs the search request and returns the search results to the directory search bot (at 705). The directory search bot forwards the search results to the user in the form of a message in the chat session (at 706). According to one embodiment, the directory search bot includes a URL for individual search results so that the user can access the search results via the web user interface of the user directory.

Figure 15:
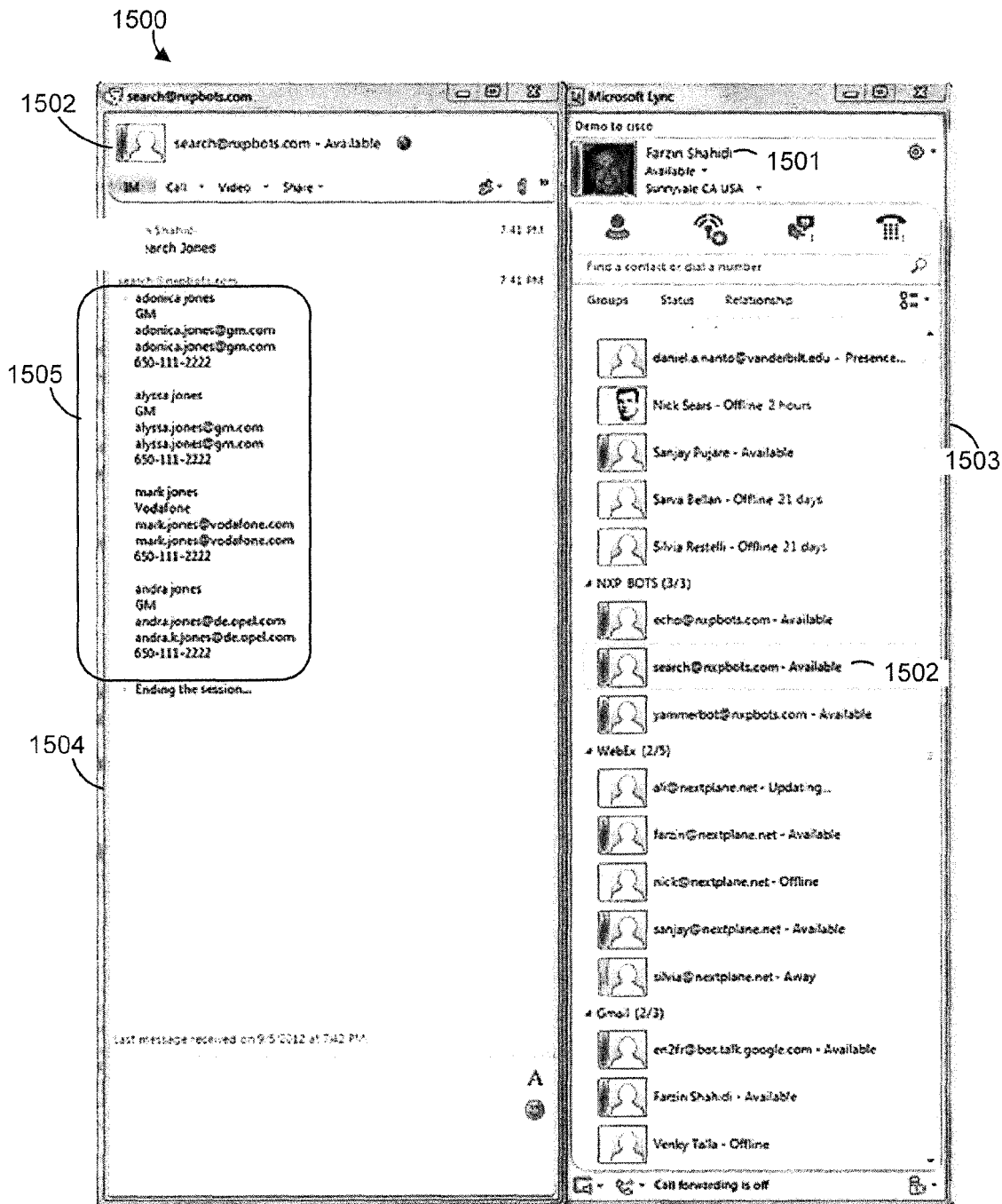
FIG. 15 illustrates a screenshot of an exemplary chat session interface with a directory search bot, according to one embodiment.

FIG. 15 illustrates a screenshot of an exemplary chat session interface with a directory search bot, according to one embodiment. A user 1501 adds a chat address (e.g., search@nxpbots.com) of a directory search bot 1502 to his/her contact list 1503. The user 1502 creates a chat session 1505 with the directory search bot 1502 and enters a search query in the chat session 1505. The directory search bot 1502 returns the search results 1505 in the chat session 1505.

According to one embodiment, a user can communicate with a bot to perform a variety of functions, such as updating user information, creating and managing a user network, performing search queries, bulk loading/bulk updating directory entries, generating usage reports and access control.

Figure 16:
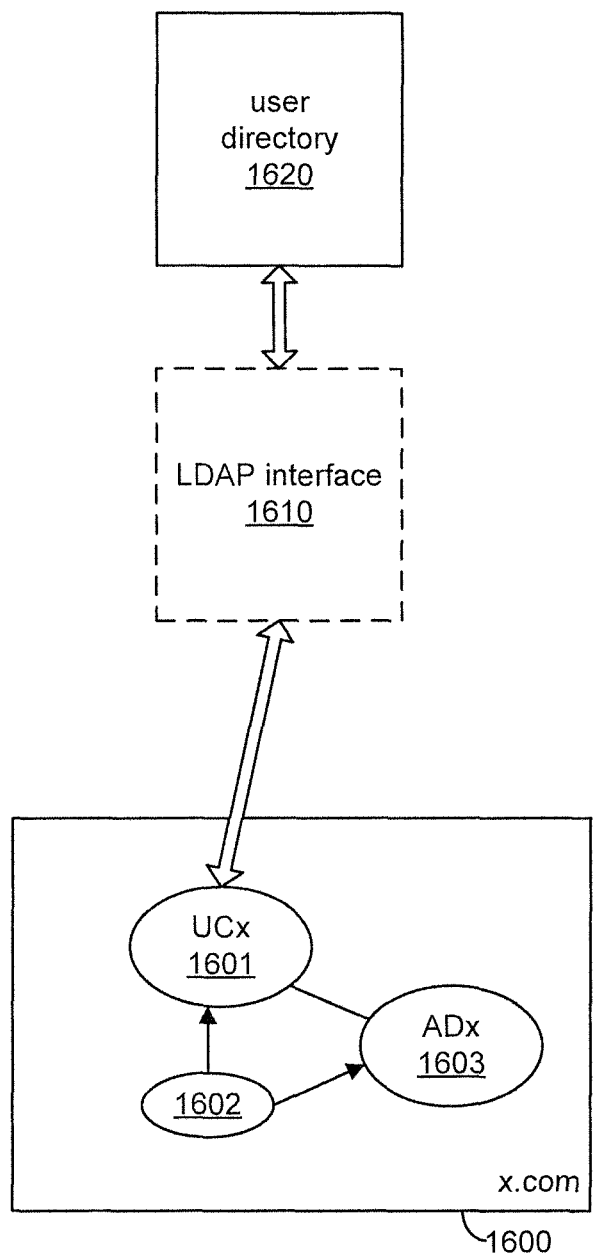
FIG. 16 illustrates a diagram of an exemplary Lightweight Directory Access Protocol (LDAP) interface to the present user directory system, according to one embodiment.

According to another embodiment, the present user directory system includes a Lightweight Directory Access Protocol (LDAP) interface to support search queries on the user directory from a UC system. FIG. 16 illustrates a diagram of an exemplary LDAP interface to the present user directory system, according to one embodiment. A domain x.com 1600 is supported by a UC system 1601 that provides functions such as receiving LDAP search queries from a user 1602, and providing search results to the user 1602. The UC system 1601 may communicate with a local active directory (AD) 1603 that is implemented as a LDAP server to support LDAP search queries from the user 1602. The UC system 1601 may further communicate with a LDAP interface 1610 of the user directory 1620 to support LDAP search queries from the user 1602. In one embodiment, the user directory 1620 includes the LDAP interface 1610 as an API that communicates with the UC system 1601 for searching the user directory 1620.

According to one embodiment, users from multiple UC systems that are federated (internally or externally) share a common domain name. This feature is mostly used by organizations that maintain multiple UC solutions, or are in the process of migrating from one to another. The present system allows users from one UC system to access user information of other users in another UC system sharing the same domain name from the user directory as long as both UC systems are federated with the hub.

According to one embodiment, data stored in the directory storage stores relational tables. The relational tables include user entry tables, domain entry tables, role entry tables, access control entry tables, user network entry tables, activity log entry tables, and configuration entry tables.

The user entry table includes user information of a user. FIG. 8 illustrates an exemplary user entry table, according to one embodiment. The user attribute column 801 of the user entry table 800 provides attributes related to a user (e.g., name, job title, address). The data type column 802 indicates the type of data for each user attribute. The nullability column 803 indicates whether each user attribute is mandatory. The default column 804 indicates a default value for each user attribute. In particular, the ID 805 is an identifier that serves as an entry identifier when table 800 is updated or merged.

The domain entry table includes domain information of a domain that is registered with the user directory. FIG. 9 illustrates an exemplary domain entry table, according to one embodiment. The domain attribute column 901 of domain entry table 900 provides attributes related to a domain (e.g., name, address, administrator). The data type column 902 indicates the type of data for each domain attribute. The nullability column 903 indicates whether each domain attribute is mandatory. The default column 904 indicates a default value for each domain attribute.

The role entry table defines groups or sets of users with certain privileges. FIG. 10 illustrates an exemplary role entry table, according to one embodiment. The role attribute column 1001 of the role entry table 1000 provides attributes related to the roles for the users. The data type column 1002 indicates the type of data for each role attribute. The nullability column 1003 indicates whether each role attribute is mandatory. The default column 1004 indicates a default value for each role attribute.

The access control entry table includes information defining access to the directory entries. FIG. 11 illustrates an exemplary access control entry table, according to one embodiment. The access attribute column 1101 of the access control entry table 1100 provides attributes related to access control provided to users of the user directory. The data type column 1102 indicates the type of data for each access attribute. The nullability column 1103 indicates whether each access attribute is mandatory. The default column 1104 indicates a default value for each access attribute.

The user network entry table stores user network information for the users. When a user creates a new user network or modifies his/her user network, the user network entry table is updated. FIG. 12 illustrates an exemplary user network entry table, according to one embodiment. The user network attribute column 1201 of the user network entry table 1200 provides attributes related to the user networks created by the users in the user directory. The data type column 1202 indicates the type of data for each user network attribute. The nullability column 1203 indicates whether each user network attribute is mandatory. The default column 1204 indicates a default value for each user network attribute.

The activity log entry table monitors and logs operations on the user directory. FIG. 13 illustrates an exemplary activity log entry table, according to one embodiment. The activity attribute column 1301 of the activity log table 1300 provides attributes of an activity (e.g., user ID, time started, activity). The data type column 1302 indicates the type of data for each activity attribute. The nullability column 1303 indicates whether each activity attribute is mandatory. The default value column 1304 indicates a default value for each activity attribute.

The configuration entry table stores administration and configuration information of the user directory. According to one embodiment, the configuration entry table stores configuration information from configuration files of the AD from domains that are registered with the user directory. FIG. 14 illustrates an exemplary data configuration entry table, according to one embodiment. The configuration attribute column 1401 of the configuration entry table 1400 provides attributes of a particular configuration of the user directory or AD. The data type column 1402 indicates the type of data for each configuration attribute. The nullability column 1403 indicates whether each configuration attribute is mandatory. The default value column 1404 indicates a default value for each configuration attribute.

According to one embodiment, the user directory provides various query features for searching directory entries in the user directory, including structured (field search) and key word search. The web user interface to the user directory includes a search window that allows a user to provide a search query. According to one embodiment, the user directory executes the search query and displays the search results in a tabulated format.

According to one embodiment, a user inputs values for key attributes for searching. The present system builds a search query using the user-specified attributed values and searches for directory entries with the specified attribute values. The user has various search options including grouping, proximity, fuzzy, range, wild cards, boosting and escaping. According to one embodiment, the search query is based on Apache's Lucine search technology.

The syntax for search queries is illustrated in the following examples:
1. "jakarta apache" NOT "Apache Lucene"
2. title:"The Right Way" AND text:go
3. title:{Aida TO Carmen}
4. te?t
5. test*

A search query is broken up into terms and operators. There are two types of terms: single terms and phrases. A single term is a single word (e.g., "test" and "hello"). A phrase is a group of words surrounded by double quotes (e.g., "hello dolly"). Multiple terms may be combined together with Boolean operators to form a more complex search query.

According to one embodiment, the user directory supports fielded data. When a user provides a search query, he/she either specifies a field, or uses the default field. In one embodiment, the user searches for any field by typing the field name followed by a colon ":" and then the search term. For instance, assume that a search engine index contains two fields, title and text, and text is the default field. If a user wants to search for a document entitled "The Right Way" which contains the text "don't go this way", the user may enter a query string:
    title: "The Right Way" AND text:go
Since text is the default field, the field indicator is not required. Thus, the user alternatively enters a query string:
    title: "The Right Way" AND go
If the user enters a query string:
    title: The Right Way,
the search engine only searches for "The" in the title field as the fields is only valid for the term that it directly precedes. The search engine searches for "Right" and "Way" in the default field (i.e., the text field).

According to one embodiment, the search engine supports modifying query terms to provide a wide range of searching options. In one embodiment, the search engine supports single and multiple character wildcard searches within single terms (not within phrase queries). The search engine supports the use of a symbol (e.g., "?" symbol) to perform a single character wildcard search. The single character wildcard search looks for terms that match that with the single character replaced. For instance, if a user wants to search for "text" or "test", the user enters a query string:
    te?t
The search engine supports the use of a second symbol (e.g., "*" symbol) to perform a multiple character wildcard search. A multiple character wildcard search looks for zero or more characters. The multiple character wildcard search may be used in the middle of a term.

For instance, if a user wants to search for test, tests, or tester, the user enters a query string:
    test*
According to one embodiment, the search engine supports fuzzy searches based on the Levenshtein Distance, or Edit Distance algorithm. A user performs a fuzzy search by using the tilde, "~", symbol at the end of a single word term. For instance, if a user wants to search for a term similar in spelling to "roam", the user enters a query string:
    roam~
This allows the search engine to search for terms such as foam and roams. The user may further specify a required similarity for the search term by stating an optional parameter. The value is between 0 and 1, with a value closer to 1 indicating that terms with a higher similarity are matched. The search engine may provide a default parameter for the search term if the user does not provide one (e.g., 0.5). For instance, a user enters a query string:
    roam~0.8
According to one embodiment, the search engine supports finding words within a specific distance away by performing a proximity search. A user may perform a proximity search by using the tilde, "~", symbol at the end of a phrase term. For instance, if a user wants to search for a "apache" and "Jakarta" within ten words of each other, the user enters a query string:
    "jakarta apache"~10
According to one embodiment, the search engine supports matching documents whose field(s) values are between a lower and upper bound as specified by a range query. A range query may be inclusive or exclusive of the upper and lower bounds based on enclosing the search term in different brackets (e.g., [ ] for inclusive and { } for exclusive). Sorting is done lexicographically. For instance, a user enters a query string:

mod_date[20020101 TO 20030101]

The search engine finds documents whose mod_date fields have values between 20020101 and 20030101, inclusive. If a user enters a query string:

title:{Aida TO Carmen} the search engine finds all documents whose titles are between Aida and Carmen, but not including Aida and Carmen.

According to one embodiment, the search engine controls the relevance of a document by boosting its search term. A user may boost a search term by using the caret, "^", symbol with a boost factor (a number) at the end of the search term. The higher the boost factor, the more relevant the term is. For example, if a user wants to search for "Jakarta apache" and wants the term "Jakarta" to be more relevant, the user enters a query string:

jakarta^4 apache

The search engine enables documents with the term "Jakarta" appear more relevant. The user may also boost phrase terms. For instance, the user enters a query string:

"jakarta apache"^4 "Apache Lucene"

The boost factor may be a default number (e.g., 1). The boost factor may be a positive number less than 1 (e.g., 0.2).

According to one embodiment, the search engine supports the use of Boolean operators that allow terms to be combined through logic operators. Boolean operators include AND, "+", OR, NOT and "−". In one embodiment, the OR operator is the default conjunction operator. This means that if there is no Boolean operator between two terms, the OR operator is used. The OR operator links two terms and finds a matching document if either of the terms exist in a document. This is equivalent to a union using sets. The symbol || can be used in place of the word OR. For instance, if a user wants to search for documents that contain either "Jakarta apache" or just "Jakarta", the user enters a query string:

"jakarta apache" jakarta

Alternatively, a user enters a query string:

"jakarta apache" OR jakarta

The AND operator matches documents where both terms exist anywhere in the text of a single document. This is equivalent to an intersection using sets. The symbol && may be used in place of the word AND. For instance, if a user wants to search for documents that contain "jakarta apache" and "Apache Lucene", the user enters a query string:

"jakarta apache" AND "Apache Lucene"

The "+" or required operator requires that the term after the "+" symbol exist somewhere in the field of a single document. For instance, if a user wants to search for documents that must contain "jakarta" and may contain "lucene", the user enters a query string:

+jakarta lucene

The NOT operator excludes documents that contain the term after NOT. This is equivalent to a difference using sets. The symbol "!" may be used in place of the word NOT. For instance, if a user wants to search for documents that contain "jakarta apache" but not "Apache Lucene", the user enters a query string:

"jakarta apache" NOT "Apache Lucene"

The "−" or prohibit operator excludes documents that contain the term after the "−" symbol. For instance, if a user wants to search for documents that contain "jakarta apache" but not "Apache Lucene", the user enters a query string:

"jakarta apache"-"Apache Lucene"

According to one embodiment, the search engine supports using parentheses to group clauses to form sub queries. A user can make use of parentheses to control the Boolean logic for a search query. For instance, if a user wants to search for either "jakarta" or "apache" and "website", the user enters a query string:

(jakarta OR apache) AND website

This ensures that the search term "website" must exist and either search term "jakarta" or "apache" may exist.

According to one embodiment, the search engine supports using parentheses to group multiple clauses to a single field. For instance, if a user wants to search for a title that contains both a single term "return" and the phrase "pink panther", the user enters a query string:

title:(+return+"pink panther")

According to one embodiment, the search engine supports escaping special characters (e.g., +−&&||!( ){ }[ ]^"~*?:\) that are part of the query syntax. A user can make use of the symbol \ before the special characters that are part of the query. For instance, if a user wants to search for (1+1):2, the user may enter a query string: \(1\+1\)\:2

According to one embodiment, the user directory is administered and managed via the web user interface using web-site monitoring tools. The user directory may be internally monitored using standard monitoring tools (e.g., java management extensions (JMX)). The monitored information (e.g., performance, and status) is collected and made available by the directory engine as well as the search engine.

Figure 17:
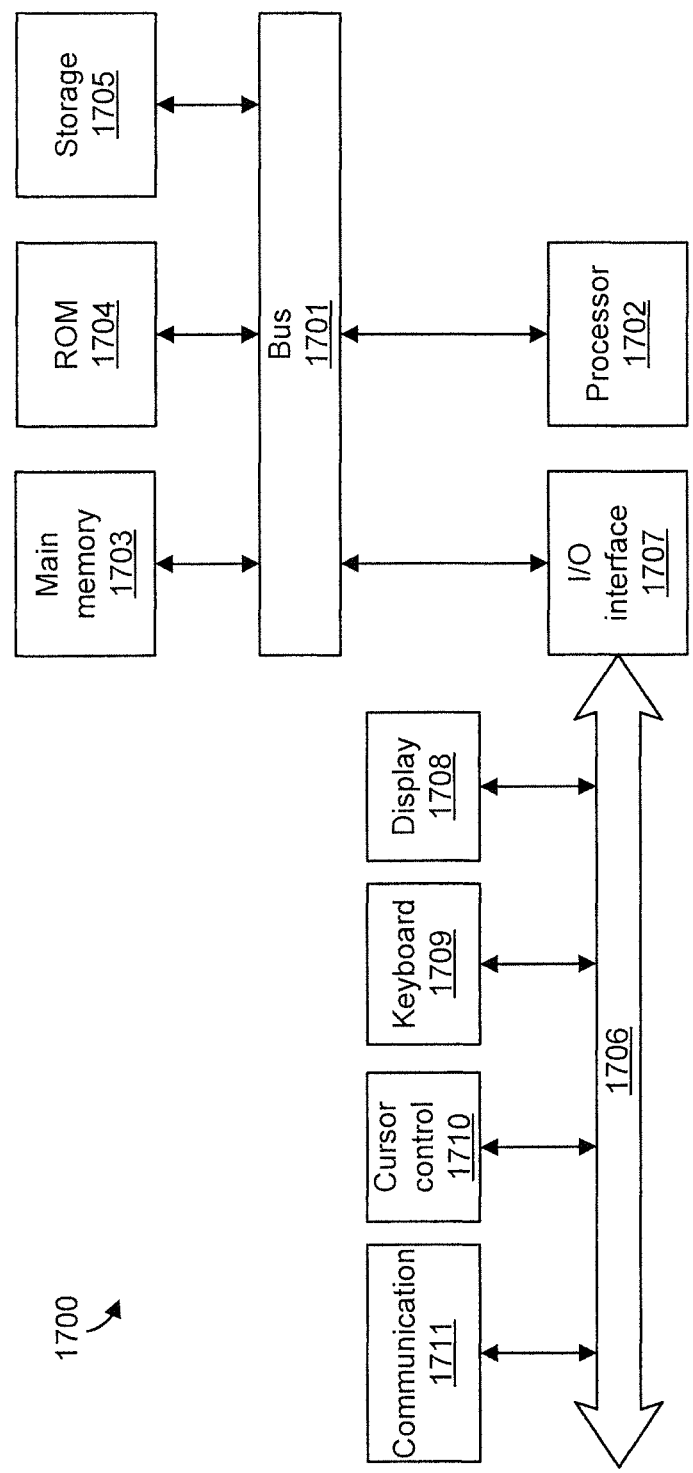
FIG. 17 illustrates an exemplary computer architecture that may be used for the present system, according to one embodiment.

FIG. 17 illustrates an exemplary computer architecture that may be used for the present system, according to one embodiment. The exemplary computer architecture may be used for implementing one or more components described in the present disclosure including, but not limited to, the present system. One embodiment of architecture 1700 includes a system bus 1701 for communicating information, and a processor 1702 coupled to bus 1701 for processing information. Architecture 1700 further includes a random access memory (RAM) or other dynamic storage device 1703 (referred to herein as main memory), coupled to bus 1701 for storing information and instructions to be executed by processor 1702. Main memory 1703 also may be used for storing temporary variables or other intermediate information during execution of instructions by processor 1702. Architecture 1700 may also include a read only memory (ROM) and/or other static storage device 1704 coupled to bus 1701 for storing static information and instructions used by processor 1702.

A data storage device 1705 such as a magnetic disk or optical disc and its corresponding drive may also be coupled to architecture 1700 for storing information and instructions. Architecture 1700 can also be coupled to a second I/O bus 1706 via an I/O interface 1707. A plurality of I/O devices may be coupled to I/O bus 1706, including a display device 1708, an input device (e.g., an alphanumeric input device 1709 and/or a cursor control device 1710).

The communication device 1711 allows for access to other computers (e.g., servers or clients) via a network. The communication device 1711 may include one or more modems, network interface cards, wireless network interfaces or other interface devices, such as those used for coupling to Ethernet, token ring, or other types of networks.

The above example embodiments have been described hereinabove to illustrate various embodiments of implementing a user directory for a hub-based system federating disparate unified communications systems. Various modifications and departures from the disclosed example embodiments will occur to those having ordinary skill in the art. The subject matter that is intended to be within the scope of the invention is set forth in the following claims.

We claim:

1. A computer-implemented method, comprising:
connecting a first unified communications system and a second unified communications system through a federation server;
registering the first unified communications system with a user directory server;
receiving into the first unified communications system a synchronization key from the user directory server;
synchronizing a directory entry from a directory of the first unified communications system to the user directory server based on transmitting the synchronization key from the first unified communications system to the user directory server, wherein the directory entry contains user information of the first unified communications system; and
providing the second unified communications system with an access to the directory entry.

2. The computer-implemented method of claim 1, further comprising registering a domain of the first unified communications system with the user directory server.

3. The computer-implemented method of claim 1, further comprising registering a domain of the second unified communications system with the user directory server.

4. The computer-implemented method of claim 1, wherein synchronizing the directory entry comprises mapping the directory entry from a first directory format of the directory to a second directory format of the user directory server.

5. The computer-implemented method of claim 4, wherein synchronizing the directory entry comprises one or more of uploading the directory entry from the directory to the user directory server, modifying the directory entry in the user directory server, and deleting the directory entry in the user directory server.

6. The computer-implemented method of claim 1, wherein synchronizing the directory entry is based on periodic synchronization.

7. The computer-implemented method of claim 1, wherein synchronizing the directory entry is based on manual synchronization.

8. The computer-implemented method of claim 1, wherein synchronizing the directory entry is based on a customized configuration file, wherein the customized configuration file comprises one or more of directory entry mapping according to a directory type, directory connection information, directory authentication information, mail transfer protocol configuration attributes, restriction query string and exclusion rules.

9. The computer-implemented method of claim 1, further comprising controlling an access privilege of a user from one or more of the first unified communications system and the second unified communications system.

10. The computer-implemented method of claim 1, further comprising providing a web user interface to access the user directory server in order to perform one or more of a user login, updating the directory entry, creating a user network, managing the user network, submitting a search query for the directory entry, and access control.

11. The computer-implemented method of claim 1, further comprising providing communication with a search automated application to submit a search query for the directory entry.

12. The computer-implemented method of claim 11, wherein syntax for the search query is based on one or more of a single word, a group of words, a specified field, a single character wildcard search, a multiple character wildcard search, a fuzzy search, a proximity search, a range query, a boost factor, a Boolean operator, grouping of terms in the search query, supporting escaping special characters that is part of the search query.

13. The computer-implemented method of claim 1, further comprising providing the second unified communications system with the access to the directory entry via a Lightweight Directory Access Protocol (LDAP) interface of the user directory server.

14. A system, comprising:
a federation server that is connected to a first unified communications system and a second unified communications system;
a user directory server that registers the first unified communications system, wherein the user directory server provides a synchronization key to the first unified communications system;
a synchronization tool that is connected to a directory of the first unified communications system, wherein the synchronization tool includes a non-transitory computer readable medium having stored thereon computer-readable instructions and a processor coupled to the non-transitory computer readable medium, wherein the processor executes the instructions to synchronize a directory entry from the directory to the user directory server based on transmitting the synchronization key to the user directory server, wherein the directory entry contains user information of the first unified communications system, and wherein the second unified communications system is provided with an access to the directory entry.

15. The system of claim 14, further comprising a domain of the first unified communications system that is registered with the user directory server.

16. The system of claim 14, further comprising a domain of the second unified communications system that is registered with the user directory server.

17. The system of claim 14, wherein the synchronization tool maps the directory entry from a first directory format of the directory to a second directory format of the user directory server.

18. The system of claim 17, wherein the synchronization tool performs one or more of uploading the directory entry from the directory to the user directory server, modifying the directory entry in the user directory server, and deleting the directory entry in the user directory server.

19. The system of claim 14, wherein the synchronization tool synchronizes the directory entry based on periodic synchronization.

20. The system of claim 14, wherein the synchronization tool synchronizes the directory entry based on manual synchronization.

21. The system of claim 14, wherein the synchronization tool synchronizes the directory entry based on a customized configuration file, wherein the customized configuration file comprises one or more of directory entry mapping according to a directory type, directory connection information, directory authentication information, mail transfer protocol configuration attributes, restriction query string and exclusion rules.

22. The system of claim 14, wherein the user directory server controls an access privilege of a user from one or more of the first unified communications system and the second unified communications system.

23. The system of claim 14, further comprising a web user interface that accesses the user directory server in order to perform one or more of a user login, updating the directory entry, creating a user network, managing the user network, submitting a search query for the directory entry, and access control.

24. The system of claim 14, further comprising a search automated application that communicates with the first unified communications system to submit a search query for the directory entry.

25. The system of claim 24, wherein syntax for the search query is based on one or more of a single word, a group of words, a specified field, a single character wildcard search, a multiple character wildcard search, a fuzzy search, a proximity search, a range query, a boost factor, a Boolean operator, grouping of terms in the search query, supporting escaping special characters that is part of the search query.

26. The system of claim 14, wherein the user directory server comprises a lightweight Directory Access Protocol (LDAP) interface to provide the second unified communications system with the access to the directory entry.

27. The system of claim 14, wherein the user directory server comprises:
 a directory engine comprising a directory utility that receives the synchronized directory entry and an application-programming interface (API) that interfaces between the directory utility and one or more of a web user interface and a search automated application; and
 a directory storage that is connected to the directory engine via database connections, wherein the directory storage stores the synchronized directory entry.

28. The system of claim 27, wherein the directory storage stores one or more of domain information of the first unified communications system, user role information, access control information, user network information, an activity log, and a configuration.

29. The system of claim 27, wherein the directory storage is based on tables stored on a structured query language (SOL) server.

30. The system of claim 27, wherein the API is representational state transfer (REST) based services described by web application description language (WADL) implementation.

31. The system of claim 27, wherein the directory engine comprises a search engine.

32. The system of claim 27, further comprising a search server that interfaces with the user directory server via the API.

* * * * *